(12) United States Patent
Yamamoto et al.

(10) Patent No.: US 7,946,592 B2
(45) Date of Patent: May 24, 2011

(54) BEARING SEAL

(75) Inventors: Hiroshi Yamamoto, Kawasaki (JP); Jun Maruyama, Yokohama (JP); Masato Miyake, Hiratsuka (JP); Kazuhiro Hatake, Hiratsuka (JP); Toru Matsuyama, Hiratsuka (JP)

(73) Assignees: Komatsu Corporation, Tokyo (JP); NOK Corporation, Tokyo (JP)

( * ) Notice: Subject to any disclaimer, the term of this patent is extended or adjusted under 35 U.S.C. 154(b) by 453 days.

(21) Appl. No.: 11/666,516

(22) PCT Filed: Nov. 1, 2005

(86) PCT No.: PCT/JP2005/020081
§ 371 (c)(1),
(2), (4) Date: Apr. 27, 2007

(87) PCT Pub. No.: WO2006/049152
PCT Pub. Date: May 11, 2006

(65) Prior Publication Data
US 2008/0054573 A1    Mar. 6, 2008

(30) Foreign Application Priority Data

Nov. 2, 2004    (JP) .................................. 2004-319832

(51) Int. Cl.
*F16J 15/32* (2006.01)
(52) U.S. Cl. ........................................................ 277/572
(58) Field of Classification Search .................. 277/549, 277/551, 572, 604
See application file for complete search history.

(56) References Cited

U.S. PATENT DOCUMENTS 2,926,035 A * 2/1960 Peickii et al. .................. 277/572
3,467,395 A * 9/1969 Kan .............................. 277/551
(Continued)

FOREIGN PATENT DOCUMENTS

JP    61-093604 A    5/1986
(Continued)

OTHER PUBLICATIONS

Chinese Office Action dated Feb. 20, 2009 (4 pages), and English translation thereof (6 pages), issued in counterpart Chinese Application Serial No. 200580037882.8.

(Continued)

*Primary Examiner* — Shane Bomar
*Assistant Examiner* — Gilbert Y Lee
(74) *Attorney, Agent, or Firm* — Holtz, Holtz, Goodman & Chick, PC

(57) ABSTRACT

A bearing seal includes: a ring-shaped outer seal portion; a ring-shaped inner seal portion provided inside the outer seal portion; a connecting portion for connecting the inner seal portion and the outer seal portion; and a ring-shaped rigid portion provided at the connecting portion. The outer seal portion, the inner seal portion, and the connecting portion are integrally formed of the same material consisting of an elastic material. The inner seal portion has rigidity higher than that of the outer seal portion, and has a ring-shaped seal surface gradually approaching a ring center axis of the inner seal portion while extending from a ring-shaped base end side connected to the connecting portion toward a distal end side. The inner seal portion is formed in a tapered cylindrical shape having the ring-shaped seal surface on an inner peripheral surface thereof, and has a thickness which gradually decreases from the base end side toward the distal end side. The inner seal portion includes only one inner seal portion.

8 Claims, 14 Drawing Sheets

U.S. PATENT DOCUMENTS

| | | | |
|---|---|---|---|
| 4,172,599 A * | 10/1979 | Forch | 277/552 |
| 4,575,104 A * | 3/1986 | Nagasawa et al. | 277/551 |
| 4,623,153 A * | 11/1986 | Nagasawa | 277/551 |
| 4,690,414 A | 9/1987 | Haaland | 277/616 |
| 5,002,287 A * | 3/1991 | Eskilsson | 277/571 |
| 5,082,294 A * | 1/1992 | Toth et al. | 277/551 |
| 5,385,351 A * | 1/1995 | White | 277/572 |
| 5,421,591 A * | 6/1995 | Katzensteiner | 277/550 |
| 6,168,165 B1 * | 1/2001 | Sabo | 277/562 |
| 6,601,855 B1 * | 8/2003 | Clark | 277/549 |
| 6,676,132 B1 * | 1/2004 | Takebayashi et al. | 277/560 |
| 7,458,586 B2 * | 12/2008 | Salameh | 277/591 |
| 2003/0189297 A1 * | 10/2003 | Chen | 277/549 |
| 2006/0279046 A1 * | 12/2006 | Vogt et al. | 277/549 |
| 2007/0052180 A1 * | 3/2007 | Watanabe et al. | 277/551 |

FOREIGN PATENT DOCUMENTS

| | | | |
|---|---|---|---|
| JP | 64-000766 A | 1/1989 | |
| JP | 5-57519 U | 7/1993 | |
| JP | 6-53861 U | 7/1994 | |
| JP | 6-201056 A | 7/1994 | |
| JP | 9-96366 A | 4/1997 | |
| JP | 2003-139149 A | 5/2003 | |
| JP | 2003-269616 A | 9/2003 | |
| JP | 2003-322163 A | 11/2003 | |
| WO | WO 03/069177 A1 | 8/2003 | |
| WO | WO 2004097234 A1 * | 11/2004 | |

OTHER PUBLICATIONS

Japanese Office Action dated Jun. 15, 2010 and English translation thereof, issued in counterpart Japanese Application No. 2006-542390.

* cited by examiner

BEARING SEAL

This application is a U.S. National Phase Application under 35 USC 371 of International Application PCT/JP2005/020081 filed Nov. 1, 2005.

TECHNICAL FIELD

The present invention relates to a bearing seal mainly used in a pin hinge joint for a construction machinery such as a hydraulic excavator.

BACKGROUND ART

In a hydraulic excavator as a construction machinery, a boom and an arm, as well as an arm and a bucket, are swingably coupled by a pin.

In a portion coupled by the pin, namely in a pin hinge joint, lubricant oil such as grease is generally injected into between the pin and a boss to make the swinging motion smooth, as well as to prevent wear and noise caused by metal contact.

Further, a bearing seal called radial lip seal is used to prevent earth and the like from entering through between the pin and the boss from an outside, as well as to prevent the lubricant oil from leaking out through a clearance between the pin and the boss.

An example of such a bearing seal is described in, for example, Patent Document 1.

The bearing seal as described in Patent Document 1 includes, as shown in FIG. 14, a flex ring 1, a tension ring 2, and a seal ring 3. The flex ring 1 fits to a boss 4, and the seal ring 3 is attached so as to be brought into contact with a pin 5.

In the bearing seal mentioned above, a mounting ring 6 is mounted on an outer periphery of the flex ring 1 to make the flex ring 1 easy to be fitted to the boss 4.

In the bearing seal as described in Patent Document 1, when mounting the seal ring 3 to the pin 5, the tension ring 2 is expanded in a radial direction so that a diameter thereof is enlarged, and the seal ring 3 is brought into press contact with the pin 5 by a fastening force caused by shrinkage of the tension ring 2. Thus, a large surface pressure (namely, seal surface pressure) in the radial direction, for example, a surface pressure of 20 N/cm is generated on the seal ring 3.

For this reason, a material having high tensile modulus of, for example, 300 to 14,000 MPa and high elongation of, for example, 5% or higher is used for the tension ring 2.

As described above, since the seal surface pressure on the seal ring 3 is generated by the fastening force of the tension ring 2, the seal ring 3 is required to be provided with two seal lips of a seal lip 3a and a stabilizer lip 3b to improve sealing performance.

If the seal lip is formed of only one piece, the tension ring 2 does not evenly shrink in a width direction (axial direction of pin 5), and fall of the seal lip occurs, so that the seal lip is not properly brought into press contact with the pin 5, thus causing the sealing performance to be deteriorated. For this reason, the aforementioned stabilizer lip 3b is added, whereby the tension ring 2 can evenly shrink in the width direction, and the seal lip can be properly brought into press contact with the pin 5. Accordingly, sealing performance in normal time can be favorably maintained.

Since the seal ring 3 has the seal lip 3a and the stabilizer lip 3b, when the pin 5 and the boss 4 rotate against each other, a frictional force is generated in two positions, that is, the seal lip 3a and the stabilizer lip 3b, so that the frictional force becomes greater.

The flex ring 1 is made strong to resist the great frictional force. In other words, as the frictional force becomes greater, when the pin 5 and the boss 4 rotate against each other, a great rotating force acts on the flex ring 1. Accordingly, the flex ring 1 may be damaged if it is weak, therefore, as described above, the flex ring 1 is made strong so as not to be damaged.

[Patent Document 1] JP-A-06-201056

DISCLOSURE OF THE INVENTION

Problems to be Solved by the Invention

There is a clearance between the boss 4 and the pin 5, and when subjected to vibration caused by impact, the pin 5 moves in the radius direction by an amount equal to the clearance.

As long as the seal ring 3 is displaced in the radius direction following the movement (displacement) of the pin 5 in the radius direction, the sealing performance is maintained. However since the seal ring 3 is brought into press contact with the pin 5 by the fastening force of the tension ring 2, and the flex ring 1 is strong so that the seal ring 3 is difficult to be displaced in the radius direction, it is difficult to displace the seal ring 3 in the radius direction following the displacement of the pin 5 in the radius direction. Thus, a clearance is generated between the seal lip 3a of the seal ring 3 and the pin 5 due to the displacement of the pin 5 in the radius direction, so that sealing performance is deteriorated, and there is a problem of earth and sand entering, and the lubricant oil leaking out through a seal section.

That is, in a construction machinery such as a hydraulic excavator, since the vibration caused by impact is great, the pin 5 of the bearing seal used for the pin hinge joint is repeatedly displaced in the radius direction at high speed.

When the pin 5 is displaced to one side in the radius direction (for example, to upper side of FIG. 14), since the flex ring 1 is difficult to be displaced, one side of each of the seal ring 3 and the tension ring 2 (for example, upper half of FIG. 14) in the radius direction is deformed by being pressurized by the pin 5. At this time, since a speed of the displacement of the pin 5 is high, and the flex ring 1 is difficult to be displaced, the other side of each of the seal ring 3 and the tension ring 2 (for example, lower half of FIG. 14) in the radius direction delays to follow the displacement of the pin 5. Therefore, the seal lip 3a fails in keeping press contact state with the pin 5, and the seal lip 3a is detached from the pin 5.

Thus, the sealing performance of the bearing seal as described in Patent Document 1 is favorable in normal time, but is deteriorated when vibration caused by impact is applied.

It is an object of the present invention to provide a bearing seal not only whose sealing performance is favorable in normal time, but also whose sealing performance can be prevented from being deteriorated when subjected to vibration caused by impact.

Means for Solving the Problems

A bearing seal includes: a ring-shaped outer seal portion; a ring-shaped inner seal portion provided inside the outer seal portion; a connecting portion for connecting the inner seal portion and the outer seal portion; and a ring-shaped rigid portion provided at the connecting portion, and is characterized in that: the outer seal portion, the inner seal portion, and the connecting portion are integrally formed of the same material consisting of an elastic material; and the inner seal portion has rigidity higher than that of the outer seal portion, and has a ring-shaped seal surface gradually approaching a ring center axis of the inner seal portion while extending from a ring-shaped base end side connected to the connecting portion toward a distal end side.

The inner seal portion is formed in a tapered cylindrical shape having the ring-shaped seal surface on an inner peripheral surface thereof, and has a thickness which gradually decreases from the base end side toward the distal end side. The inner seal portion includes only one inner seal portion.

Here, as an elastic material, it is possible to use a material such as NBR, silicone rubber, or fluororubber as well as urethane rubber having high sand abrasion resistance.

Further, the inner seal portion is formed in a tapered cylindrical shape having the ring-shapted seal surface on an inner peripheral surface thereof, and has a thickness which gradually decreases from the base end side toward the distal end side. Herein, in order to make the rigidity of the inner seal portion higher than that of the outer seal portion, a sectional shape of the inner seal portion and a sectional shape of the outer seal portion are made different from each other, for example.

Further, the ring-shaped seal surface provided to the inner seal portion refers to a surface, which comes into press contact with an outer peripheral surface of a shaft, for sealing the outer periphery of the shaft in a state where the bearing seal is mounted on the outer peripheral surface of the shaft portion. A shape of the ring-shaped seal surface may be any shape as long as the inner seal portion gradually approaches a ring central axis of the inner seal portion while extending from the base end side toward the distal end side, so that, for example, a conical surface or the like is preferable.

As a second aspect of the invention, in the bearing seal according to the first aspect of the invention, the inner seal portion has a thick portion on the distal end side.

As a third aspect of the invention, in the bearing seal according to the first or second aspect of the invention. The ring-shaped rigid portion is integrally formed from the same material as the outer seal portion, the inner seal portion, and the connecting portion.

As a fourth aspect of the invention, in the bearing seal according to the first or second aspects of the inventions, the ring-shaped rigid portion is separate from the outer seal portion, the inner seal portion, and the connecting portion, and is formed of a rigid body.

Herein, as the ring-shaped rigid portion formed as the separate member, there may be adopted a ring-shaped member made of plastic, carbon, SPC (SPC steel), or the like.

As a fifth aspect of the invention, in the bearing seal according to the fourth aspect of the invention, the ring-shaped rigid portion is partially or entirely embedded in the connecting portion.

As a sixth aspect of the invention, in the bearing seal according to the fourth aspect of the invention, the ring-shaped rigid portion is partially brought into contact with the connecting portion.

Here, in order to embed the ring-shaped rigid portion in the connecting portion, there may be adopted a method of integrally embedding the ring-shaped rigid portion, in which the ring-shaped rigid portion is set in the mold at the time of integrally molding the outer seal portion, the inner seal portion, and the connecting portion, as well as a method of incorporating the ring-shaped rigid portion in a housing groove after forming the housing groove for the ring-shaped rigid portion in the connecting portion.

As a seventh aspect of the invention, the bearing seal according to any one of the first to sixth aspects of the inventions further includes an outer ring made of a rigid body and formed in a ring shape so that the outer ring surrounds the outer seal portion.

Effect of the Invention

According to a bearing seal of the first aspect of the invention, the inner seal portion includes the ring-shaped seal surface gradually approaching the ring center axis of the inner seal portion while extending from the base end side of a ring shape, connected to the connecting portion, toward the distal end side. Therefore, when the bearing seal is mounted to an axis (such as pin), at least the innermost peripheral portion of the ring-shaped seal surface of the inner seal portion is brought into press contact with the outer peripheral surface of the shaft portion, thereby being elastically deformed outwardly. At this time, according to an amount of outward elastic deformation of the inner seal portion, a contact area between the ring-shaped seal surface and the outer peripheral surface of the shaft portion changes. Accordingly, an appropriate seal area according to a pressure applied to an inside of the bearing can be ensured.

In a state where the inner seal portion is elastically deformed outwardly and the ring-shaped seal surface is brought into press contact with the outer peripheral surface of the shaft portion, in the connecting portion between the inner seal portion and the outer seal portion, there is arranged the ring-shaped rigid portion, that is, there is arranged the ring-shaped rigid portion which does not expand in the radial direction. Therefore, the inner seal portion is supported by the ring-shaped rigid portion, thereby making it possible to generate a seal surface pressure with respect to the shaft portion. Accordingly, the inner seal portion can be maintained to be properly brought into press contact with the shaft portion. As a result, it is possible to prevent a clearance from being formed in a contact portion between the shaft portion and the inner seal portion and to prevent earth and the like from entering from an outside and lubricant oil such as grease from leaking out through the clearance. Accordingly, the sealing performance in normal time can be favorably maintained.

On the other hand, the inner seal portion is suppressed from being deformed in the radial direction by the ring-shaped rigid portion, and the rigidity of the inner seal portion is higher than that of the outer seal portion. Therefore, even in a case where the shaft portion is moved in the radius direction by an amount of the clearance between the boss (bearing portion) and the shaft due to vibration caused by impact or the like, the inner seal portion is displaced in the radius direction together with the shaft portion with a contacting state of the inner seal portion with respect to the shaft portion and a press-contact force thereof with respect to the shaft portion not being changed greatly. At the same time, in order to absorb the radial displacement of the shaft portion, the outer seal portion is elastically deformed to absorb the displacement of the shaft portion. Accordingly, even in a case where vibration caused by impact is exerted, it is possible to prevent the sealing performance from being deteriorated.

Further, the outer seal portion, the inner seal portion, and the connecting portion are integrally formed of the same material made of an elastic material. Accordingly, through one molding process, the outer seal portion, the inner seal portion, and the connecting portion can be molded at the same time, which can contribute to reduction of the number of manufacturing processes, reduction of manufacturing costs, and reduction of the number of components. Further, in a case where those components are integrally formed of the same material, as compared to a case where the outer seal portion and the inner seal portion are formed as separate members, the whole can be made compact, so that there is an advantage in that the present invention can be applied, in particular, to a small bearing structure.

In addition, the inner seal portion is formed in a tapered cylindrical shape and has a thickness gradually decreasing while the inner seal portion extends from the base end side toward the distal end side. Therefore, when the bearing seal is mounted to the shaft portion, according to a relationship between an outer diameter of the shaft portion and an inner diameter of the bearing seal, the ring-shaped seal surface of the inner seal portion is elastically deformed outwardly along from the distal end side to the base end side. That is, as the inner diameter of the bearing seal decreases with respect to the outer diameter of the shaft portion, the ring-shaped seal surface of the inner seal portion is gradually expanded in an elastic region while extending from the base end side toward the distal end side, and a contact pressure between the ring-shaped seal surface of the inner seal portion and the outer peripheral surface of the shaft portion continuously increases, so that high sealing performance can be exerted.

According to the bearing seal of the second aspect of the invention, the inner portion has the thick portion on the distal end side. Therefore, when the bearing seal is mounted to the shaft portion (such as pin) and the innermost peripheral portion of the ring-shaped seal surface is brought into press contact with the outer peripheral surface of the shaft portion and is elastically deformed outwardly, the thick portion on the distal end side is elongated. Due to a reaction force thereof, a tightening force with respect to the shaft portion becomes higher, so that adhering performance with respect to the shaft portion can be improved.

According to the bearing seal of the third aspect of the invention, since the ring-shaped rigid portion is integrally formed from the same material as the outer seal portion, the inner seal portion, and the connecting portion, the outer seal portion, the ring-shaped rigid portion, the connecting portion and the inner seal portion can be molded at the same time only in one molding process, thereby contributing to reduction in the number of manufacturing processes, manufacturing cost, the number of components.

According to the bearing seal of the fourth aspect of the invention, the ring-shaped rigid portion is formed of a rigid material which is separate from the outer seal portion, the inner seal portion, and the connecting portion. Therefore, according to the force applied to the bearing, material optimum for the ring-shaped rigid portion can be selected.

Accordingly, the optimum ring-shaped rigid portion can be obtained, thereby making it possible to maintain the sealing performance of the inner seal portion more reliably.

According to the bearing seal of the fifth aspect of the invention, the ring-shaped rigid portion is partially or entirely embedded in the connecting portion. Therefore, at the time of integrally molding the outer seal portion, the inner seal portion, and the connecting portion, the ring-shaped rigid portion can also be integrally embedded. Accordingly, it is possible to reduce the number of processes and the present invention can be downsized as a whole.

According to the bearing seal of the sixth aspect of the invention, a part of the ring-shaped rigid portion comes into contact with the connecting portion, so that the ring-shaped rigid portion can be fixed to the connecting portion by adhesion or using a mechanical lock tool or the like. Thus, as compared to a case where the ring-shaped rigid portion is embedded in the connecting portion, the attachment is facilitated.

According to a bearing seal of the seventh aspect of the invention, the outer ring made of a rigid body is provided so as to surround the outer seal. Accordingly, fitting and fixing the bearing seal to the bearing portion are facilitated.

Figure 1:
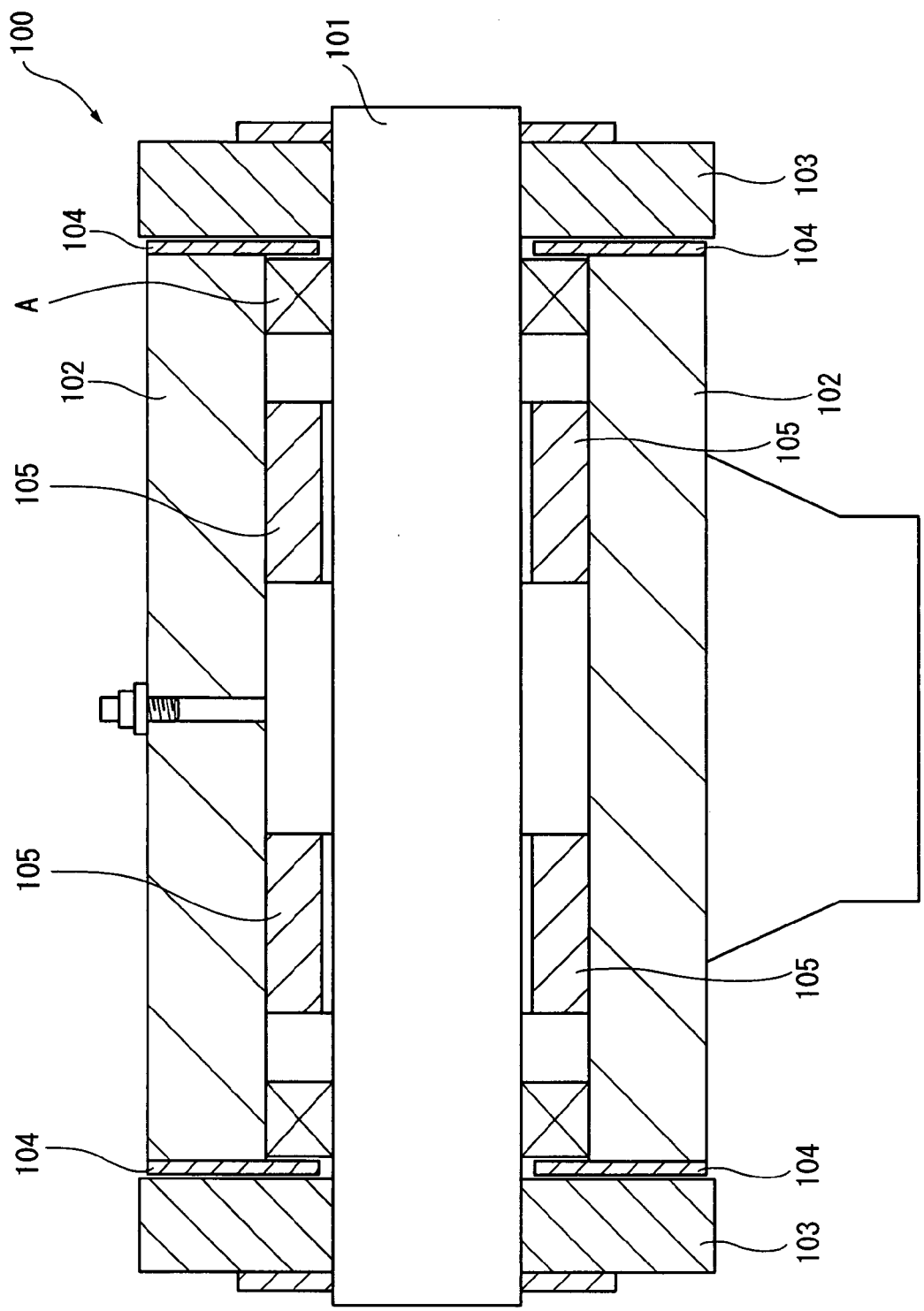
FIG. 1 is a cross sectional view showing a swing device according to a first embodiment of the present invention.

EXPLANATION OF CODES 10, 40: outer ring
20, 50: seal
25, 51: outer seal portion
26, 52: inner seal portion
26A, 52A: ring-shaped seal surface
26B, 52B: innermost peripheral portion
26C, 52C: outermost peripheral portion
27: connecting portion (ring-shaped rigid portion)
52D: thick portion
53: connecting portion
60, 61 to 65: inner ring (ring-shaped rigid portion)
A, B, B1 to B6: bearing seal

BEST MODE FOR CARRYING OUT THE INVENTION

Embodiments of the present invention will be described below with reference to the drawings.

First Embodiment (Overall Structure of Swing Device 100)
FIG. 1 shows a swing device 100 according to a first embodiment of the present invention. The swing device 100 is used as a pin hinge joint for coupling a boom and an arm which constitute a hydraulic excavator. For example, the arm as one member is provided with a pin 101 as a shaft, and the boom as the other member is provided with a boss 102 as a bearing.

The pin 101 is formed of a columnar steel material, and is fixed to brackets 103 provided at ends of the arm with bolts or the like.

The boss 102 is formed of a cylindrical steel material into which the columnar pin 101 is inserted. An inner diameter of the boss 102 is larger than an outer diameter of the pin 101, and a clearance is formed therebetween. Further, shims 104 as stopper members are provided on opening portions on ends of the cylindrical boss 102 so as to cover the clearance. Bearing portions 105 are press fitted in a center of the inner peripheral surface of the boss 102, and the pin 101 is supported by bearing surfaces of the bearing portions 105. Rotation is made between the boom and the arm by sliding the outer peripheral surface of the pin 101 with respect to the bearing surface of the bearing portion 105.

In the swing device 100, bearing seals A for sealing a cylindrical inner space of the boss 102 from an outer space are provided on inner sides of the shims 104 and on outer sides of the bearing portions 105. The inner space of the boss 102 sealed by the bearing seals A is sealed with lubricant oil such as grease. The lubricant oil sealed in the inner space of the boss 102 enters a space between the bearing surface of the bearing portion 105 and the outer peripheral surface of the pin 101, so that sliding performance therebetween is improved, and the swing device 100 is swung smoothly.

(Structure of Bearing Seal A)

Figure 2:
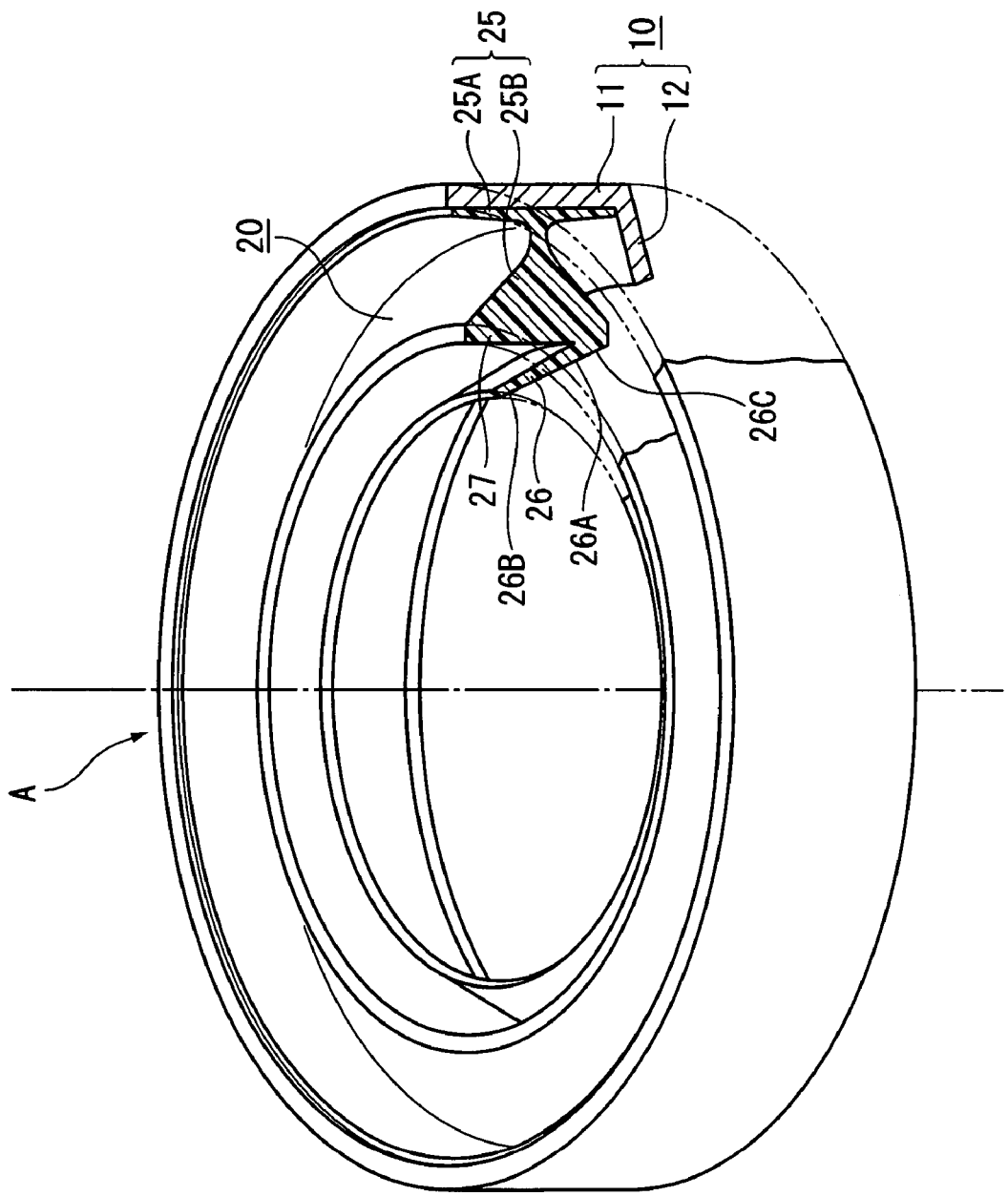
FIG. 2 is a schematic perspective view showing a structure of a bearing seal according to the first embodiment.
Figure 3:
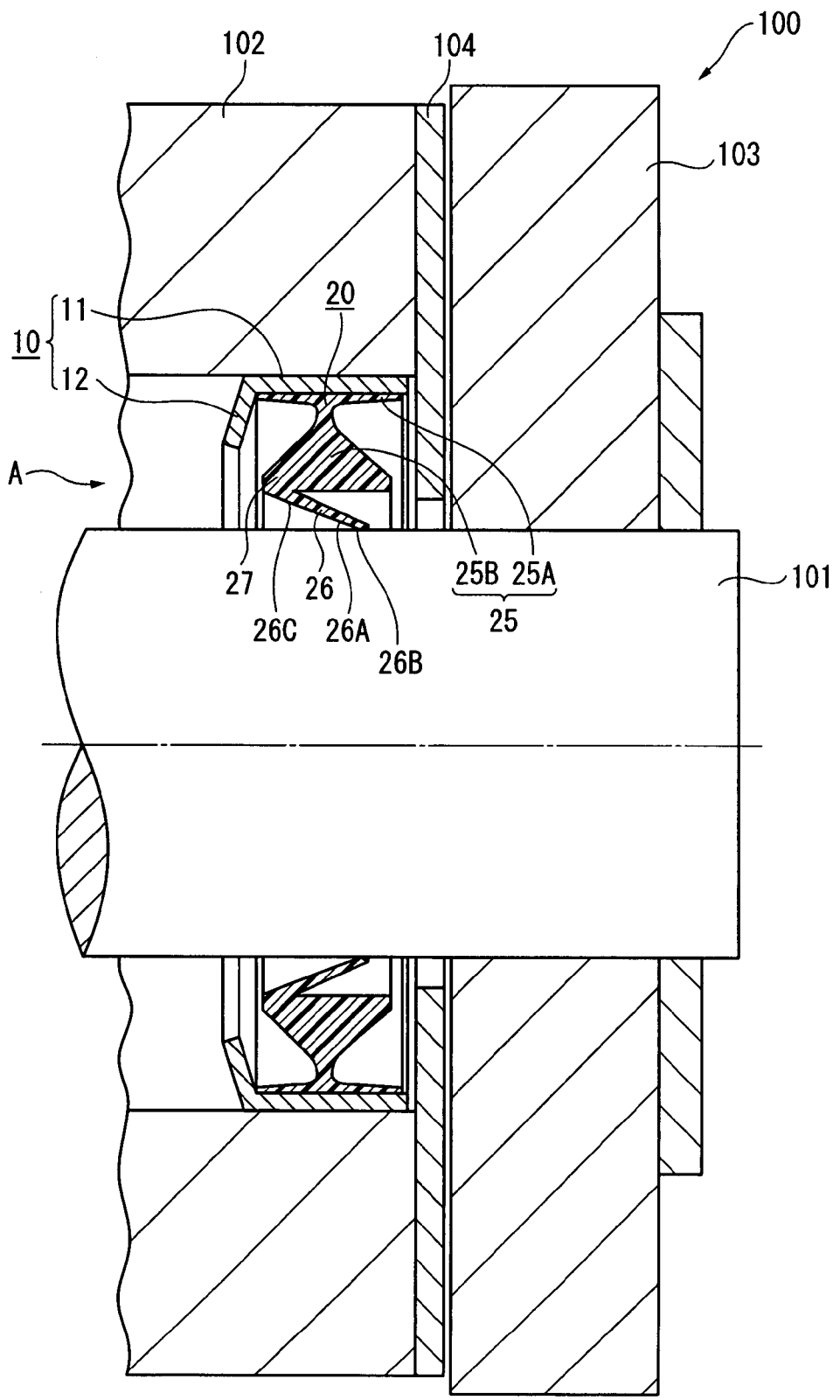
FIG. 3 is a cross sectional view showing a mounting state of a bearing seal according to the first embodiment.

FIG. 2 shows a detailed structure of a bearing seal A. FIG. 3 shows a mounting state of the bearing seal A. The bearing seal A includes an outer ring 10 and a seal 20.

The outer ring 10 is made of a rigid body and is formed in a ring shape surrounding the seal 20 from an outer side thereof. That is, the outer ring 10 is formed in a shape having a cylindrical boss fixing portion 11 fixed along an inner peripheral surface of the boss 102 and a skirt portion 12 having a tapered cylindrical shape inclined outwardly (left side of FIG. 3) while extending from an inner end (left-side end of FIG. 3) of the boss fixing portion 11 toward a center of the boss fixing portion 11. Note that, a material for the outer ring 10 may be any material as long as the material has a high rigidity, SPC steel or the like can be adopted, for example, the material is not limited to SPC steel, various material such as plastic or carbon can be selected.

The seal 20 includes a ring-shaped outer seal portion 25, a ring-shaped inner seal portion 26 provided on an inside of the outer seal portion 25, and a connecting portion 27 for connecting the inner seal portion 26 and the outer seal portion 25, which are integrally formed of the same elastic material. As the elastic material, it is possible to use a material such as NBR, silicone rubber, or fluororubber as well as urethane rubber having high sand abrasion resistance.

The outer seal portion 25 includes an outer ring fixing portion 25A and an elastic deformation portion 25B.

The outer ring fixing portion 25A is formed in a cylindrical shape having an outer diameter which is substantially the same as an inner diameter of the boss fixing portion 11 of the outer ring 10, and an outer peripheral surface thereof is fixed to an inner peripheral surface of the boss fixing portion 11.

The elastic deformation portion 25B extends from a central portion (center in axial direction) of the inner peripheral surface of the outer ring fixing portion 25A toward a central portion such that a thickness thereof is small (thickness in axial direction is small) and is formed to be increased in thickness toward the central portion (thickness in axial direction gradually increases).

The connecting portion 27 is formed to have the same thickness with an inner peripheral surface of the elastic deformation portion 25B while being integral thereto. The seal 20 according to this embodiment is formed into a shape having rigidity which gradually increases (becomes more resistant to deformation) from the elastic deformation portion 25B to the connecting portion 27. A part corresponding to the connecting portion 27 is the most resistant to deformation. In this embodiment, in the part corresponding to the connecting portion 27, a ring-shaped rigid portion is formed.

The inner seal portion 26 is formed in a tapered cylindrical shape having an inner diameter of a ring shape decreases from an inner end of the inner peripheral surface of the connecting portion 27 toward the end portion of the pin 101 (toward a side opposite to the lubricant oil storage space). That is, the inner seal portion 26 is formed in the tapered cylindrical shape having a ring-shape seal surface 26A of a conical (truncated conical) surface shape which approaches a ring center axis of the inner seal portion 26 while extending from a base end side of a ring shape, connected to the connecting portion 27, toward a distal end side (right-side direction of FIG. 3: direction opposite to the lubricant oil storage space). The inner seal portion 26 has a thickness which decreases from the base end side to the distal end side thereof. In a case where the bearing seal A is mounted on the outer peripheral surface of the pin 101, elastic deformation is performed in a state where at least an innermost peripheral portion 26B of the ring-shaped seal surface 26A comes into press contact with the outer peripheral surface of the pin 101. As the inner diameter of the of the bearing seal A decreases with respect to the outer diameter of the pin 101 (that is, as a difference therebetween increases), a contact pressure between the ring-shaped seal surface 26A and the outer peripheral surface of the pin 101 gradually increases from the innermost peripheral portion 26B toward an outermost peripheral portion 26C.

Here, a sectional shape of the outer seal portion 25, the connecting portion 27 serving also as the ring-shaped rigid portion, and the inner seal portion 26 is formed such that rigidity of the inner seal portion 26 is lower than that of the connecting portion 27 serving also as the ring-shaped rigid portion and is higher than that of the outer seal portion 25.

(Mounting State of Bearing Seal A)

In a state where the bearing seal A is not mounted on the pin 101, the inner diameter on the distal end side of the inner seal portion 26 (inner diameter of innermost peripheral portion 26B) is smaller than the outer diameter of the pin 101. When the pin 101 is inserted into the bearing seal A, the pin 101 is inserted and moved to a desired position while widening a distal end portion of the inner seal portion 26.

When the pin 101 is inserted to the desired position, the innermost peripheral portion 26B of the ring-shaped seal surface 26A of the inner seal portion 26 is brought into press contact with an outer peripheral surface of the pin 101 and is elastically deformed outwardly. At this time, according to an amount of the outward elastic deformation of the inner seal portion 26, a contact area between the ring-shaped seal surface 26A and the outer peripheral surface of the pin 101 changes. Therefore, an appropriate seal area according to a pressure applied to the bearing seal A can be ensured.

In this state, the outer ring 10 comes into intimate contact with a cylinder inner surface of the boss 102, thereby ensuring sealing performance. Further, the inner seal portion 26 is suppressed from being deformed in a radially outward direction by the connecting portion 27 serving also as the ring-shaped rigid portion on an outer side. The ring-shaped seal surface 26A of the inner seal portion 26 abuts the outer peripheral surface of the pin 101 while being biased thereto. Accordingly, in this state, sealing performance between the outer peripheral surface of the pin 101 and the inner seal portion 26 is ensured.

(Effect of Bearing Seal A)

Figure 4:
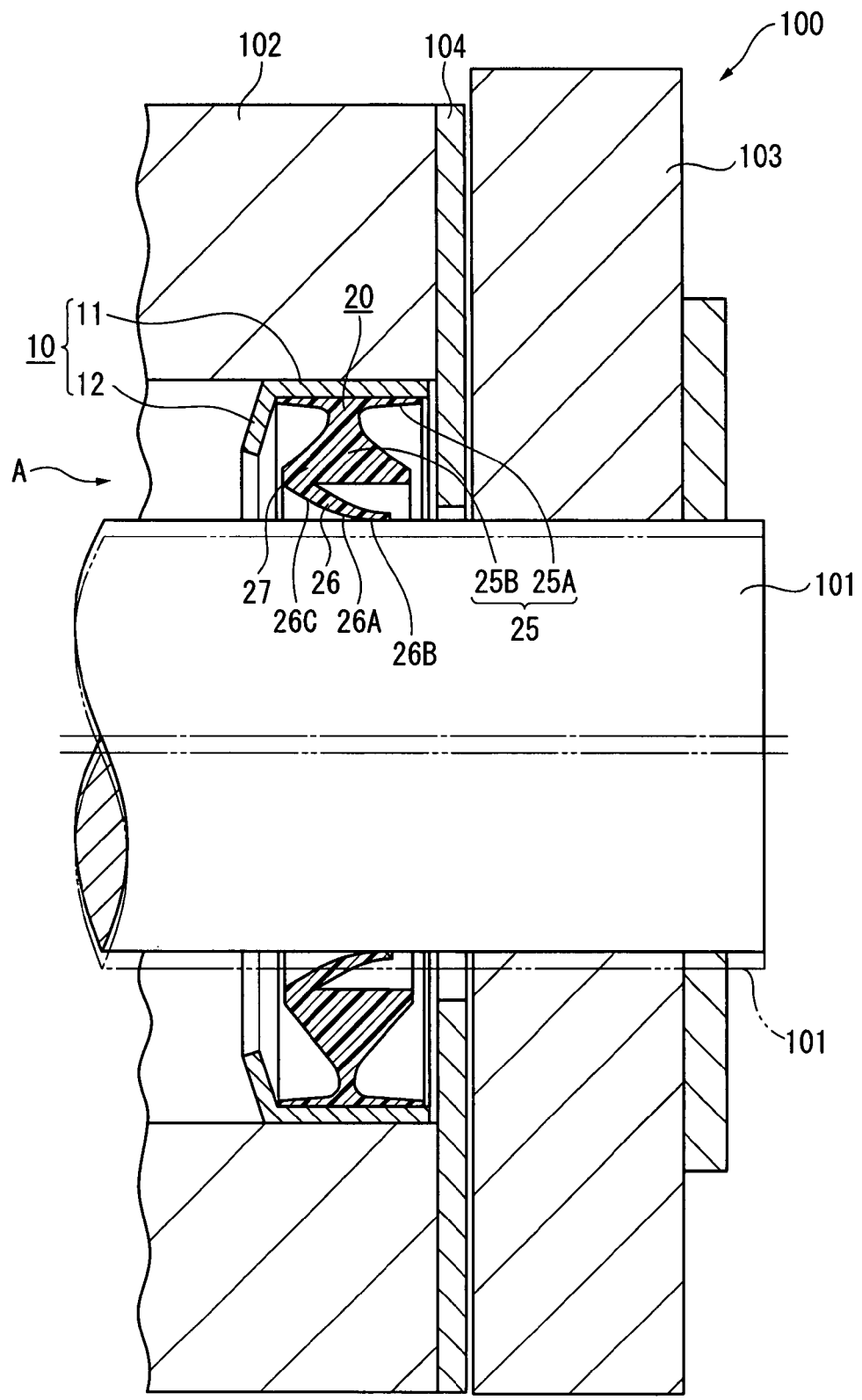
FIG. 4 is a cross sectional view for explaining a function of the bearing seal according to the first embodiment.

FIG. 4 shows a state where the pin 101 is displaced in a radius direction with respect to the boss 102 with the bearing seal A being mounted to the swing device 100.

In FIG. 4, when a great force is exerted to the arm to which the pin 101 is mounted, the pin 101, which is positioned in neutral position as indicated by a two-dot chain line, is displaced in its radius direction orthogonal to its central axis toward a position drawn by a real line. At this time, since the deformation of the inner seal portion 26 of the bearing seal A in the radial direction is suppressed by the connecting portion 27 serving also as the ring-shaped rigid portion, the inner seal portion 26 is displaced together with the pin 101 in the radius direction with no change in the abutting state between the inner seal portion 26 and the pin 101 and in the biasing force.

At this time, the elastic deformation portion 25B is deformed to absorb the displacement of the pin 101 so that the outer seal portion 25 absorbs the displacement of the pin 101. That is, in an upper portion of FIG. 4, the elastic deformation portion 25B is compressed so that an inner clearance of the outer seal portion 25 (radial clearance between outer ring fixing portion 25A and connecting portion 27) becomes narrower. In a lower portion of FIG. 4, the elastic deformation portion 25B is deformed to expand so that the inner clearance of the outer seal portion 25 (radial clearance between outer ring fixing portion 25A and connecting portion 27) becomes wider.

That is, the outer seal portion 25 is more easily deformed in the radial direction than the inner seal portion 26. Therefore, when the pin 101 moves in the radius direction by an amount of a clearance between the pin 101 and the bearing portion 105, the outer seal portion 25 can be displaced in the radius direction rapidly following the displacement of the pin 101. Accordingly, the inner seal portion 26 is not easily separated from the pin 101. Accordingly, the sealing performance in normal time can be favorably maintained, and even if rapid vibration caused impact is exerted, the sealing performance can be prevented from being deteriorated.

Note that, in the first embodiment, there are provided the outer ring 10 and the shims 104. Therefore, when lubricant oil is injected into an inner portion of the boss 102, the bearing seals A are prevented from being displaced in the axial outward direction by the inner pressure.

Further, the outer seal portion 25, the connecting portion 27 serving also as the ring-shaped rigid portion, and the inner seal portion 26 are integrally formed of the same elastic material. Therefore, the outer seal portion 25, the connecting portion 27 serving also as the ring-shaped rigid portion, and the inner seal portion 26 can be simultaneously molded by one molding process, which can contribute to reduction of the number of manufacturing processes, reduction of manufacturing costs, and reduction of the number of components.

Further, the sectional shape of the outer seal portion 25, the connecting portion 27 serving also as the ring-shaped rigid portion, and the inner seal portion 26 is changed such that the rigidity of the inner seal portion 26 is lower than that of the connecting portion 27 serving also as the ring-shaped rigid portion and is higher than that of the outer seal portion 25. Accordingly, only by changing the sectional shape, functions required of each portion can be satisfied.

Second Embodiment

Figure 5:
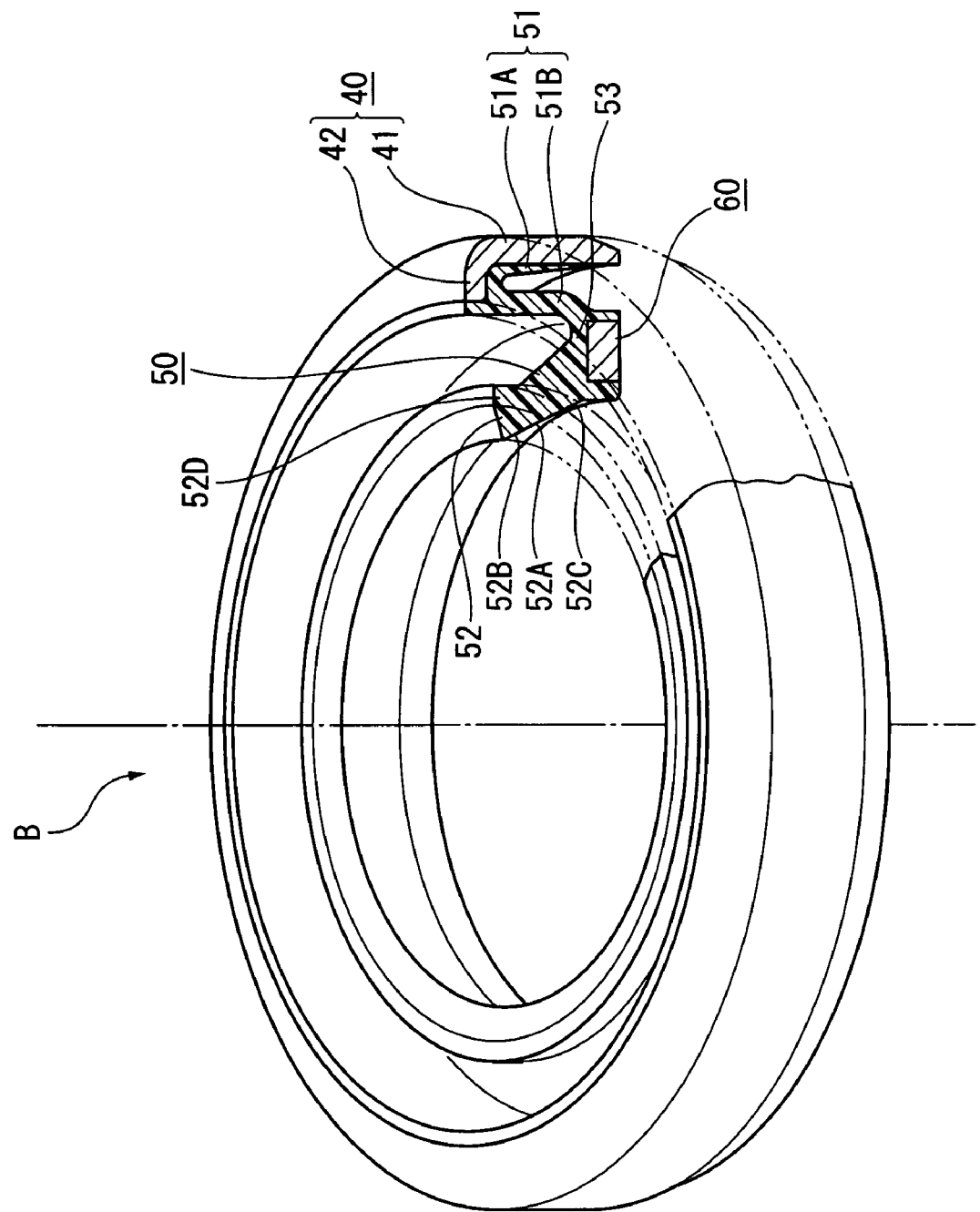
FIG. 5 is a schematic perspective view showing a structure of a bearing seal according to a second embodiment of the present invention.
Figure 6:
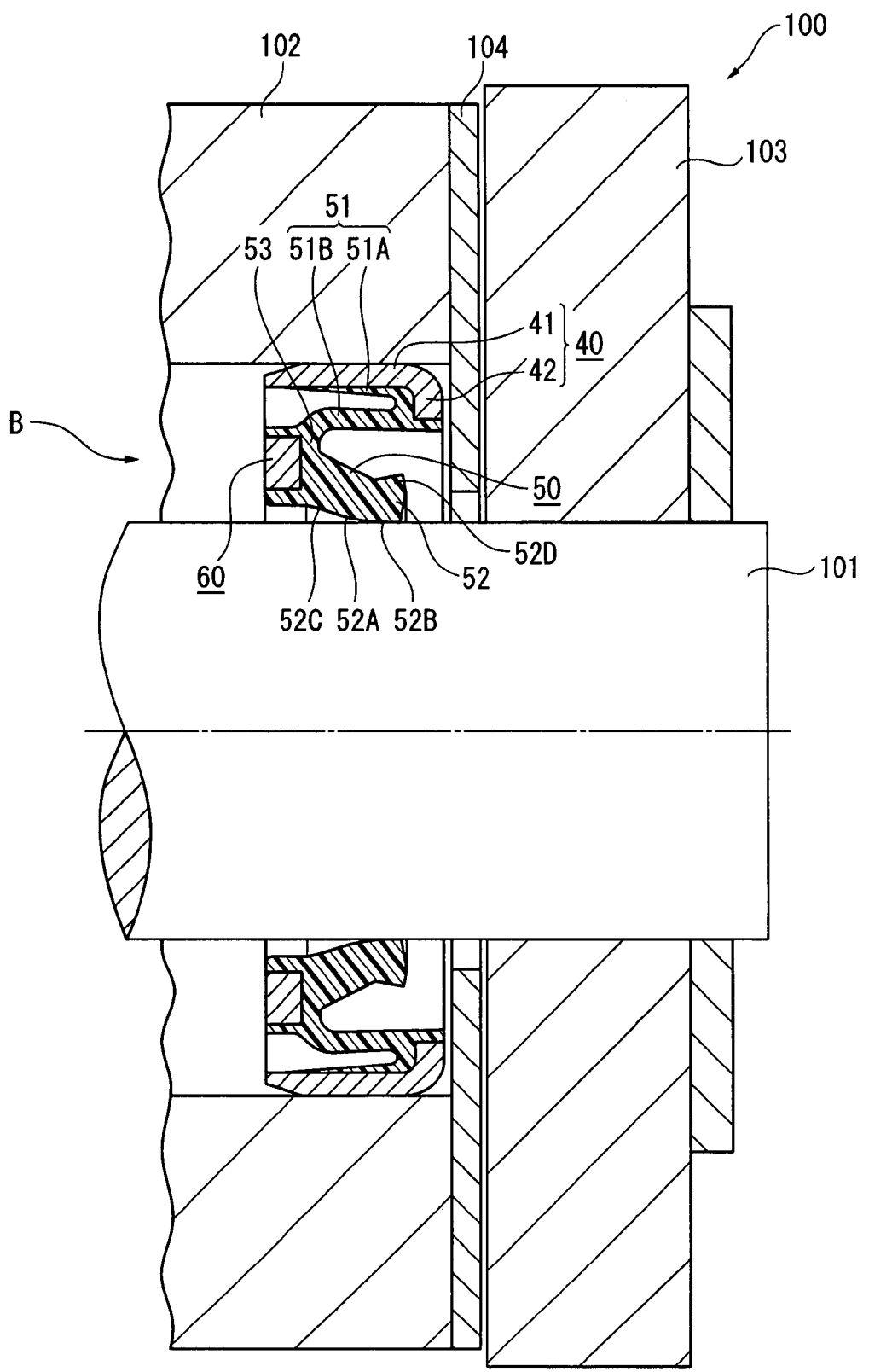
FIG. 6 is a cross sectional view showing a mounting state of a bearing seal according to the second embodiment.
Figure 7:
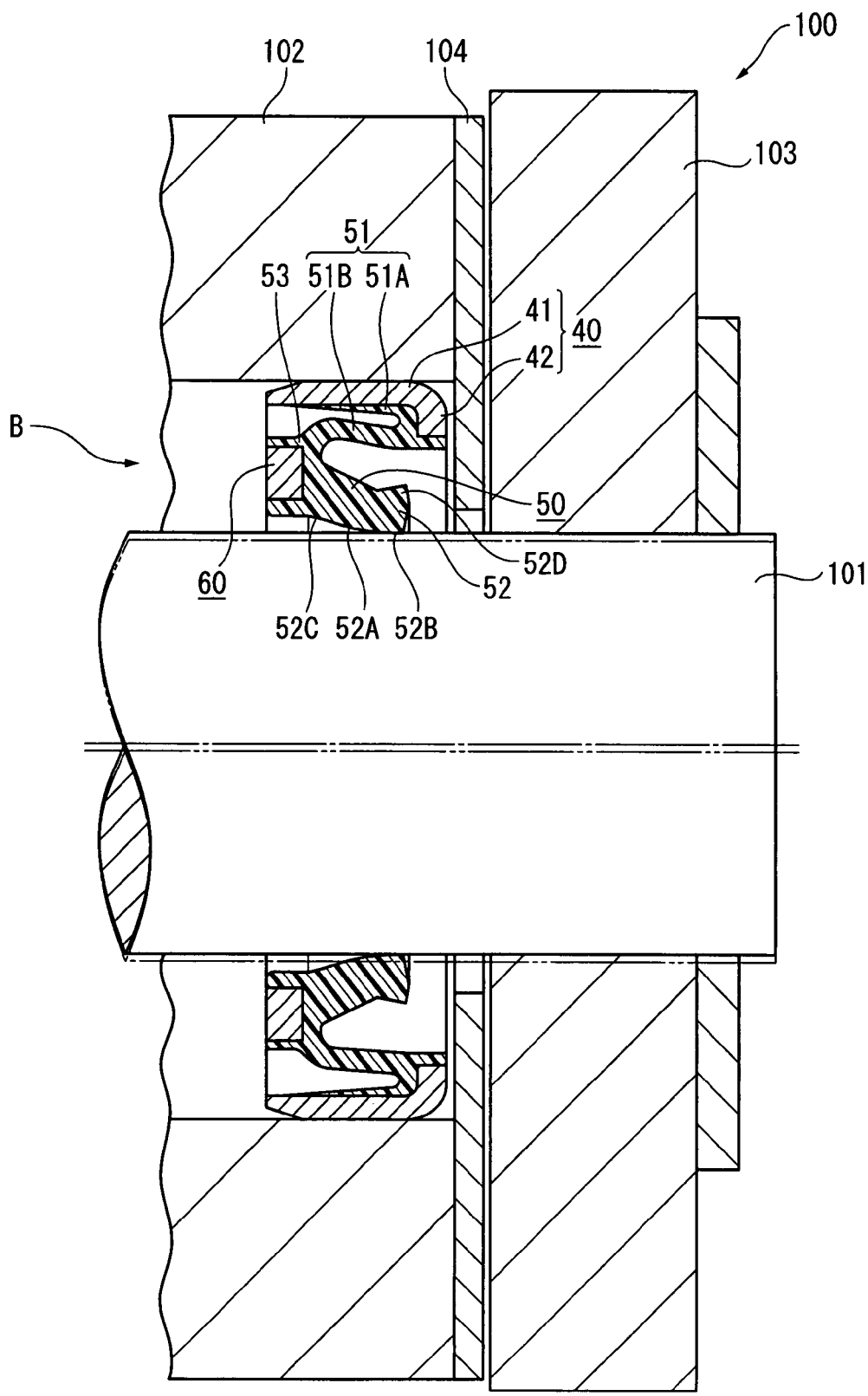
FIG. 7 is a cross sectional view for explaining a function of the bearing seal according to the second embodiment.

FIGS. 5 to 7 show a second embodiment of the present invention. In illustration of FIGS. 5 to 7, the same components as those of the first embodiment are denoted by the same reference symbols and descriptions of those will be omitted.

(Structure of Second Embodiment)

In the second embodiment, a bearing seal is different from that of the first embodiment.

(Structure of Bearing Seal B)

FIG. 5 shows a detailed structure of a bearing seal B according to the second embodiment. FIG. 6 shows a state where the bearing seal B is mounted to the swing device 100. The bearing seal B is structured by coaxially combining a plurality of ring-shaped members having different diameters, and includes a ring-shaped outer ring 40 arranged on an outermost periphery, a ring-shaped seal 50 arranged inside the outer ring 40, and an inner ring 60 as a ring-shaped rigid portion.

The outer ring 40 is made of a rigid body and is formed in a ring shape surrounding the seal 50 from an outer side thereof. That is, the outer ring 40 is formed in a shape having a cylindrical boss fixing portion 41 fixed along the inner peripheral surface of the boss 102 and a ring-shaped flange portion 42 which is deflected on an outer end (right-side end of FIG. 6: end on a side opposite to the lubricant oil storage space) of the boss fixing portion 41 at a substantially right angle toward a center of the boss fixing portion 41. Note that, used as a material for the outer ring 40 is the same material as that of the outer ring 10 according to the first embodiment.

The seal 50 includes a ring-shaped outer seal portion 51, a ring-shaped inner seal portion 52 provided inside the outer seal portion 51, and a connecting portion 53 connecting the inner seal portion 52 and the outer seal portion 51. The outer seal portion 51, the inner seal portion 52, and the connecting portion 53 are integrally formed of the same material made of an elastic material. The inner seal portion 52 has rigidity higher than the outer seal portion 51. Used as the elastic material is the same material as the elastic material of the first embodiment.

The outer seal portion 51 including an outer ring fixing portion 51A and a thin deformation portion 51B as a portion (easily deformable portion) where the deformation is the easiest as compared to the other portions is formed in a shape having a substantially U-shaped section.

The outer ring fixing portion 51A is formed in a cylindrical shape having an outer diameter substantially the same as an inner diameter of the boss fixing portion 41 of the outer ring 40. An outer peripheral surface of the outer ring fixing portion 51A is fixed to an inner peripheral surface of the boss fixing portion 41 of the outer ring 40.

The thin deformation portion 51B extends from an outer end (end on the side opposite to the lubricant storage space) of the outer ring fixing portion 51A to be formed in a cylindrical shape with a space being formed between the thin deformation portion 51B and an inner peripheral surface of the outer ring fixing portion 51A, the thin deformation portion 51B being substantially parallel to the outer ring fixing portion 51A and the thickness of the cylindrical portion being smaller than the outer portions (connecting portion 53 etc.). When the pin 101 is displaced in the radius direction by the thin deformation portion 51B, an amount of deformation of the outer seal portion 51 is larger than that of the inner seal portion 52. That is, the outer seal portion 51 has, as a part thereof, the thin deformation portion 51B which is elastically deformed in a manner easier than the other portions.

The connecting portion 53 is formed as a ring-shaped portion extending from an inner end (left-side end of FIG. 6: end on the side of the lubricant oil storage space) of the thin deformation portion 51B at a substantially right angle toward a center of the outer ring fixing portion 51A.

The inner seal portion 52 is formed in a tapered cylindrical shape having an inner diameter which gradually decreases from the connecting portion 53 toward the side opposite to the lubricant oil storage space (right side of FIG. 6). That is, the inner seal portion 52 is formed in the tapered cylindrical shape having a ring-shaped seal surface 52A, that is, a conical surface gradually approaching the ring center axis of the inner seal portion 26 while extending from a ring-shaped base end side connected to the connecting portion 53 toward a distal end side (right-side direction of FIG. 6: direction opposite to the lubricant storage space). A thickness of the inner seal portion 52 decreases from the base end side toward the distal end side. In a state where the bearing seal B is mounted to the pin 101, at least an innermost peripheral portion 52B of the ling-shaped seal surface 52A is elastically deformed outwardly while being brought into press contact with the outer peripheral surface of the pin 101. As the inner diameter of the bearing seal B decreases with respect to the outer diameter of the pin 101 (that is, as a difference therebetween increases), a contact pressure between the ring-shaped seal surface 52A and the outer peripheral surface of the pin 101 gradually increases from the innermost peripheral portion 52B toward an outermost peripheral portion 52C. Further, the distal end side of the inner seal portion 26 is formed with a thick portion 52D having a tapered cylindrical distal end of which an outer peripheral surface expands outwardly.

Here, a sectional shape of the outer seal portion 51 and the inner seal portion 52 is formed such that rigidity of the inner seal portion 52 is lower than that of the inner ring 60 and is higher than that of the outer seal portion 51.

The inner ring 60 is a member separate from the seal 50 including the outer seal portion 51, the inner seal portion 52, and the connecting portion 53, and is formed of a ring-shaped rigid body having a substantially rectangular section. The inner ring 60 is provided between the inner seal portion 52 and the outer seal portion 51, here, is embedded in the connecting portion 53 connecting the outer seal portion 51 and the inner seal portion 52. As a material for the inner ring 60, a material with high rigidity is preferable. For example, SPC steel may be adopted, and not only SPC steel, but also various materials such as plastic, carbon, or the like may be selected as long as the material has a predetermined rigidity.

(Mounting State of Bearing Seal B)

In a state where the bearing seal B is not mounted to the pin 101, the inner diameter on the distal end side of the inner seal portion 52 (inner diameter of innermost peripheral portion 52B) is smaller than the outer diameter of the pin 101. When the pin 101 is inserted into the bearing seal B, the pin 101 is inserted into the bearing seal B and moved to a desired position while widening a distal end portion of the inner seal portion 52.

When the pin 101 is inserted and reaches to the desired position, the innermost peripheral portion 52B of the ring-shaped seal surface 52A of the inner seal portion 52 is brought into press contact with the outer peripheral surface of the pin 101 to be elastically deformed outwardly. At this time, according to an amount of the outward elastic deformation of the inner seal portion 52, a contact area between the ring-shaped seal surface 52A and the outer peripheral surface of the pin 101 changes. Therefore, an optimum seal area according to a pressure applied to the bearing seal B can be ensured.

In this state, the outer ring 40 comes into intimate contact with a cylinder inner surface of the boss 102, thereby ensuring sealing performance. Further, the inner seal portion 52 is suppressed from being deformed in a radially outward direction by the inner ring 60 on the outer side. The distal end portion of the inner seal portion 52 abuts the outer peripheral surface of the pin 101 while being biased thereto. Accordingly, in this state, sealing performance between the outer peripheral surface of the pin 101 and the inner seal portion 52 is ensured.

(Effect of Bearing Seal B)

FIG. 7 shows a state where the pin 101 is displaced in the radius direction with respect to the boss 102 with the bearing seal B being mounted to the swing device 100.

In FIG. 7, when a great force is exerted to the arm to which the pin 101 is mounted, the pin 101, which is positioned in neutral position as indicated by a two-dot chain line, is displaced in its radius direction orthogonal to its central axis toward a position drawn by a real line.

At this time, since the deformation of the inner seal portion 52 of the bearing seal B in the radial direction is suppressed by the inner ring 60, the inner seal portion 52 is displaced together with the pin 101 in the radius direction with no change in the abutting state between the inner seal portion 52 and the pin 101 and in the biasing force. The thin deformation portion 51B is deformed to absorb the displacement of the pin 101 so that the outer seal portion 51 provided on the outer side of the inner seal portion 52 absorbs the displacement of the pin 101.

Specifically, in an upper portion of FIG. 7, due to the deformation of the thin deformation portion 51B, a U-shaped clearance inside the outer seal portion 51 is flattened. In a lower portion of the FIG. 7, due to the deformation of the thin deformation portion 51B, the U-shaped clearance inside the outer seal portion 51 is widened. That is, due to those deformations of the outer seal portion 51, the displacement of the pin 101 with respect to the boss 102 is absorbed, and the abutting state of the inner seal portion 52 with respect to the outer peripheral surface of the pin 101 is maintained by the inner ring 60.

On the other hand, in a case where lubricant oil such as grease is injected into the inside of the boss 102, the bearing seal B tends to protrude outwardly in the axial direction of the pin 101 due to a pressure of the lubricant oil. However, movement thereof is restricted by the outer ring 40, and a movement thereof in the same direction is restricted by the shim 104 as a stopper member. Note that, the outer seal portion 51 may be directly attached to the boss 102 without the outer ring 40.

(Modification)

The present invention is not limited to the above-mentioned embodiments, the present invention includes modification, improvements, and the like within the scope in which an object of the present invention can be achieved.

In the second embodiment, the inner ring 60 is embedded in the connecting portion 53 connecting the outer seal portion 51 and the inner seal portion 52, but this is not obligatory, and the following structure may be employed.

Figure 8:
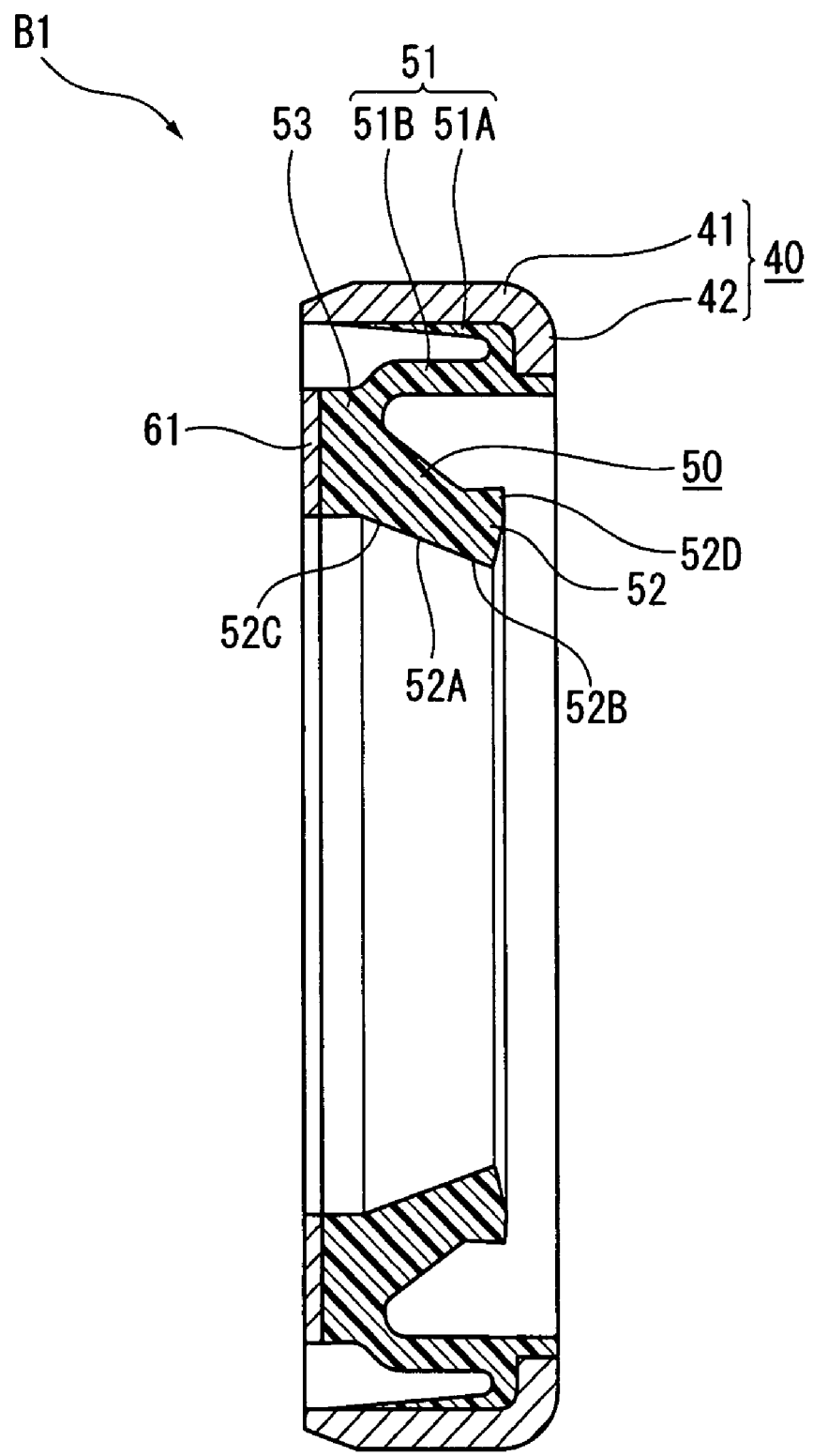
FIG. 8 is a cross sectional view for showing a modification 1 of the bearing seal according to the second embodiment.

In a bearing seal B1 (modification 1) shown in FIG. 8, one surface (a part) of an inner ring 61 comes into contact with a side of an inner end surface of the connecting portion 53 (left-side end surface of FIG. 8) and is fixed thereto. The inner ring 61 is formed in a thin ring-plate shape of which inner and outer diameters which are substantially the same as inner and outer diameters of the connecting portion 53, and an axial dimension (axial dimension of pin 101) is smaller than a difference between the inner and outer diameters. Note that, a dimension of the inner ring 61 is not limited to the above-mentioned example as long as the inner ring 61 does not inhibit deformation of the inner seal portion 52 and outer seal portion 51.

With this structure, it is possible to not only obtain the effect described in the second embodiment, but also facilitate attachment of the inner ring 61 as compared to the case where the inner ring 60 is embedded in the connecting portion 53. Examples of a method of fixing the inner ring 61 include adhesion and mechanical fixation with a lock tool or the like.

Figure 9:
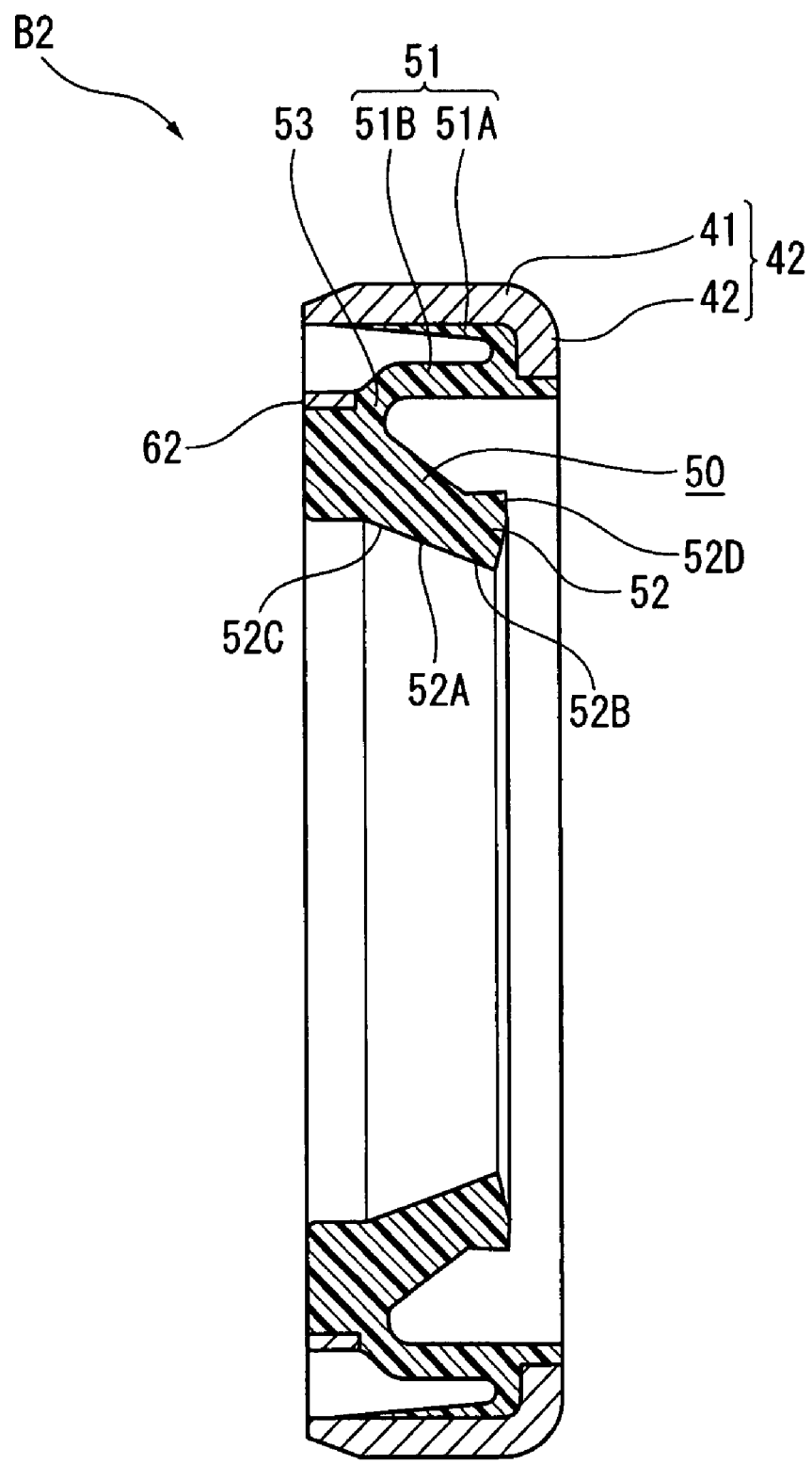
FIG. 9 is a cross sectional view for showing a modification 2 of the bearing seal according to the second embodiment.

In a bearing seal B2 (modification 2) shown in FIG. 9, an inner peripheral surface (a part) of an inner ring 62 is brought into contact with the outer peripheral surface of the connecting portion 53 and is fixed thereto. The inner ring 62 is formed in a thick ring shape of which an inner diameter and an outer diameter are slightly larger than the outer diameter of the connecting portion 53 (thickness in radial direction is small), and an axial dimension (axial dimension of pin 101) is larger than a difference between the radial dimensions.

With this structure, it is possible to not only obtain the effect described in the second embodiment and the effect described in relation to the bearing seal B1 of the modification 1, but also allow the inner ring 62 to be fitted and attached on the outer peripheral surface of the connecting portion 53, thereby making it possible to facilitate the attachment.

Figure 10:
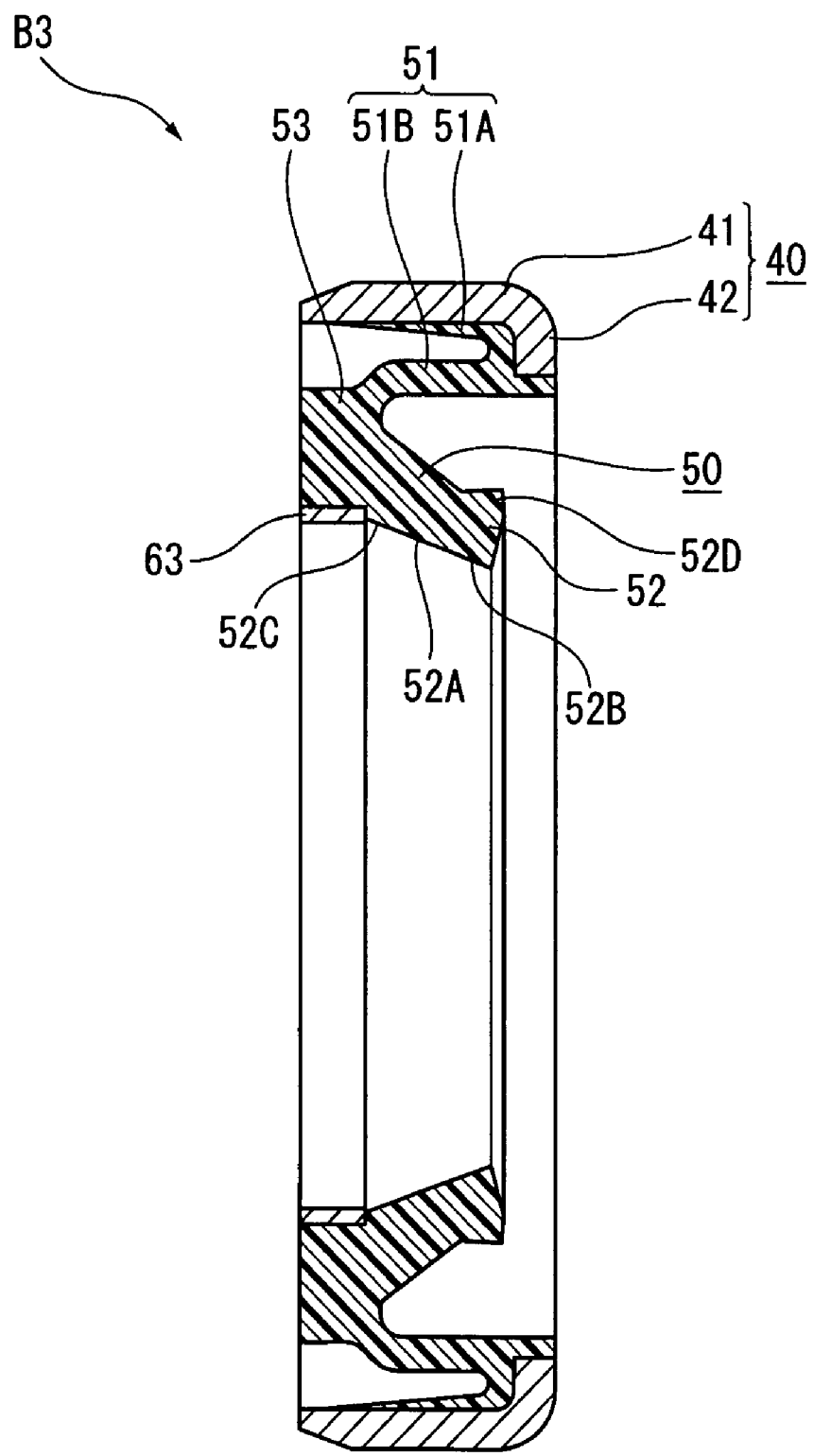
FIG. 10 is a cross sectional view for showing a modification 3 of the bearing seal according to the second embodiment.

In a bearing seal B3 (modification 3) shown in FIG. 10, an outer peripheral surface (a part) of an inner ring 63 is brought into contact with the inner peripheral surface of the connecting portion 53 and is fixed thereto. The inner ring 63 differs from the inner ring 62 only in its inner and outer diameters.

With this structure, the same effect as that of the bearing seal B2 of the modification 2 can be expected.

Figure 11:
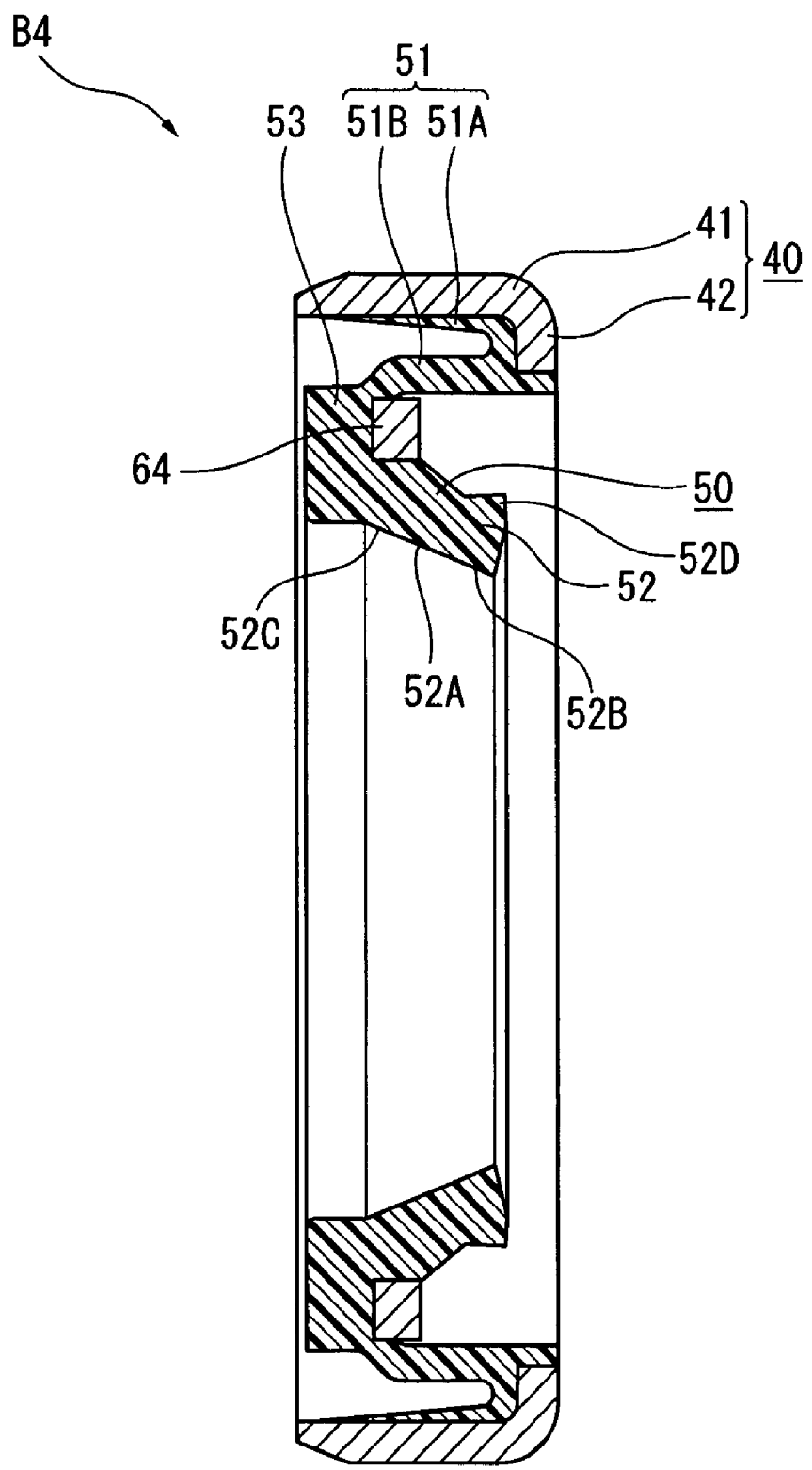
FIG. 11 is a cross sectional view for showing a modification 4 of the bearing seal according to the second embodiment.

In a bearing seal B4 (modification 4) shown in FIG. 11, a part of an inner ring 64 is embedded in a side of the outer end surface of the connecting portion 53. That is, the part thereof is provided while being embedded in the side of the outer end surface of the connecting portion 53 between the thin deformation portion 51B and the inner seal portion 52. The inner ring 64 is different from the inner ring 60 only in a point in that the sectional shape thereof is slightly smaller than that of the inner ring 60.

With this structure, the same effect as that of the second embodiment can be expected.

Figure 12:
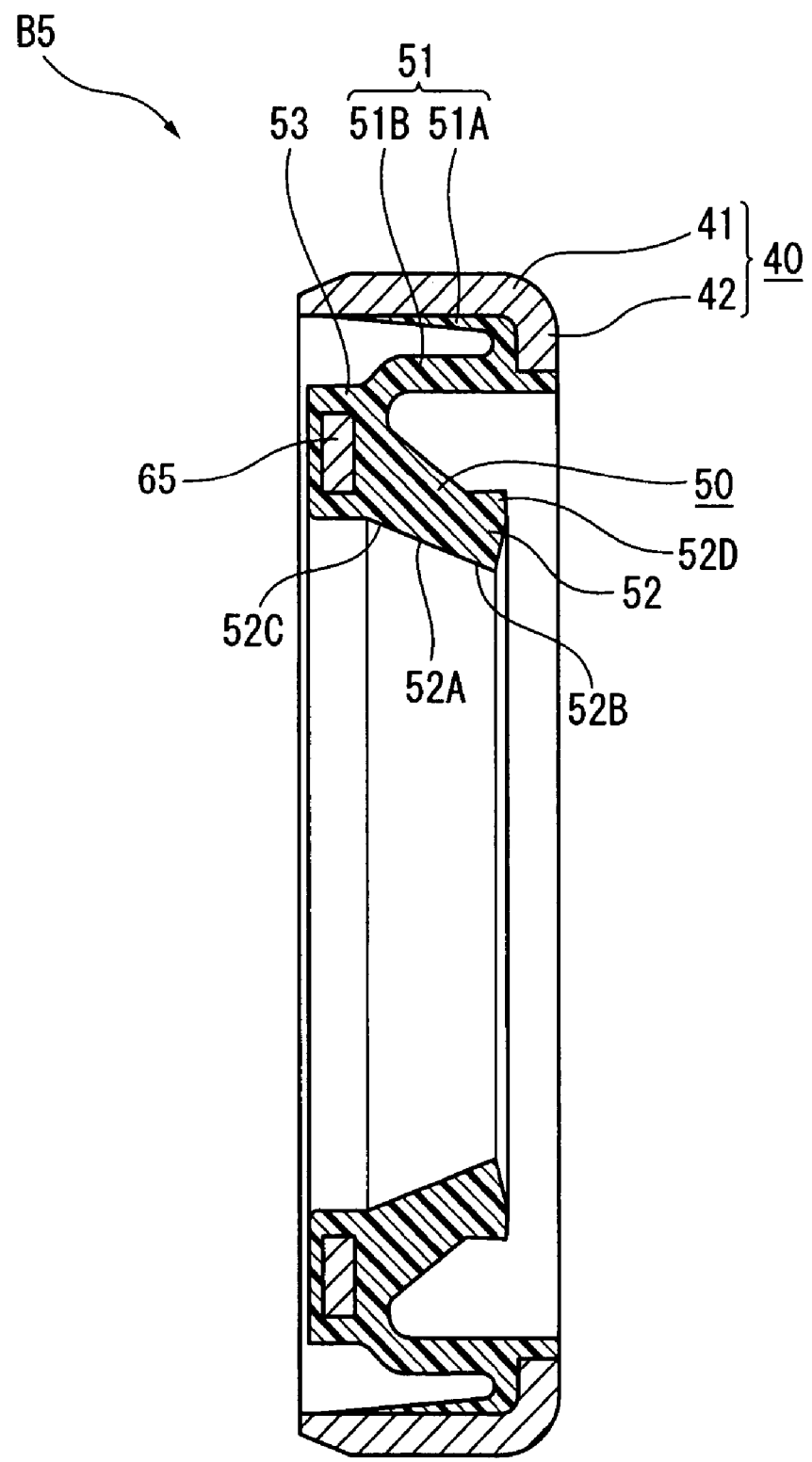
FIG. 12 is a cross sectional view for showing a modification 5 of the bearing seal according to the second embodiment.

In a bearing seal B5 (modification 5) shown in FIG. 12, an inner ring 65 is completely embedded in the inside of the connecting portion 53. The inner ring 65 is different from the inner ring 60 only in a point in that the sectional shape thereof is slightly smaller than that of the inner ring 60.

With this structure, the same effect as that of the second embodiment can be expected. In embedding the inner ring 65 in the connecting portion 53, at a time of molding the seal 50, when the inner ring 65 is set in a molding cavity, integral molding can be performed.

Figure 13:
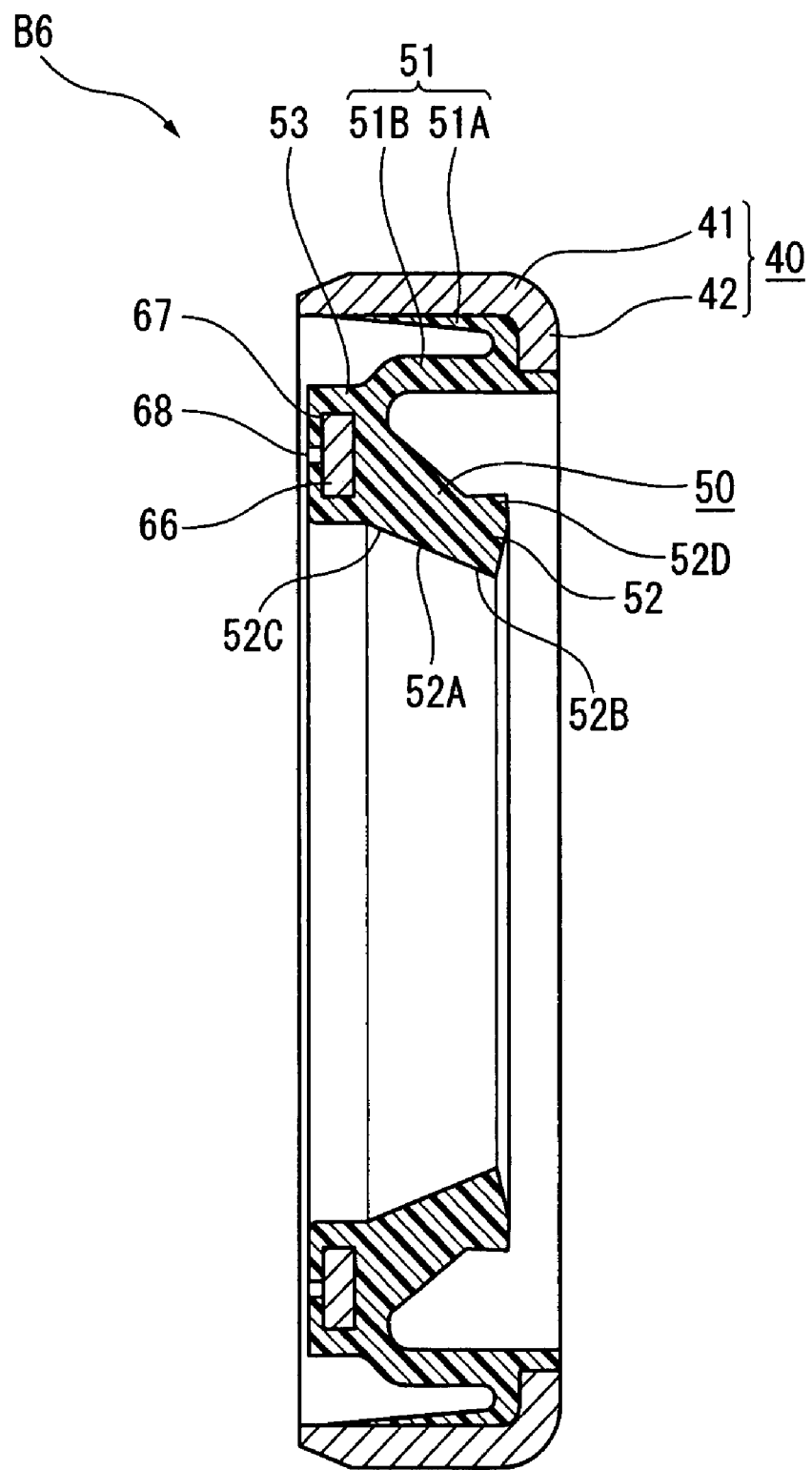
FIG. 13 is a cross sectional view for showing a modification 6 of the bearing seal according to the second embodiment.
Figure 14:
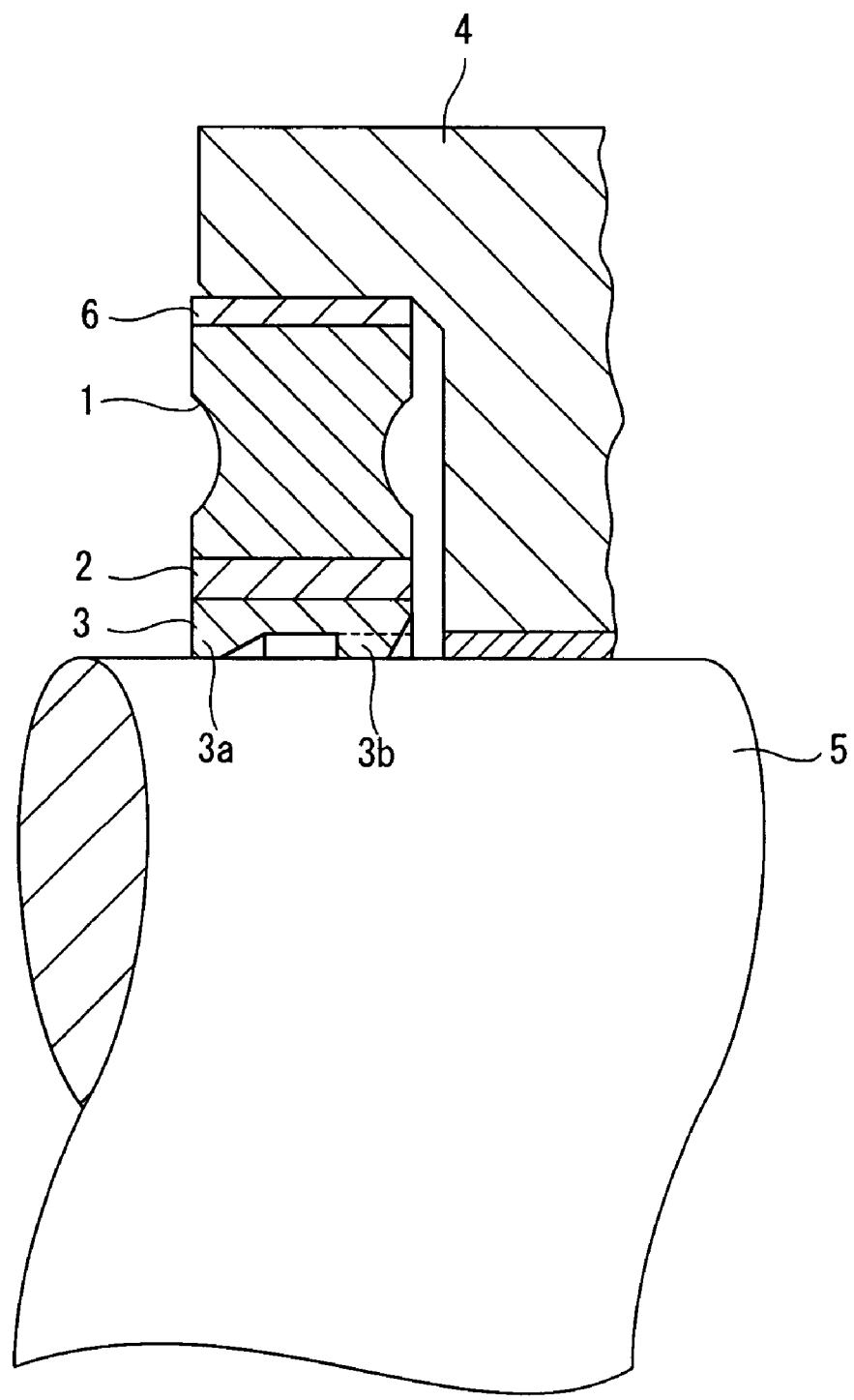
FIG. 14 is a cross sectional view showing a bearing seal in a prior art.

In a bearing seal B6 (modification 6) shown in FIG. 13, an entirety of an inner ring 66 is completely embedded in the connecting portion 53. In this example, the connecting portion 53 is formed with a housing groove 67 for housing the inner ring and an opening groove 68 for communicating the housing groove 67 and the inner end surface of the connecting portion 53. In a state where the opening groove 68 is opened, the inner ring 66 is stored in the housing groove 67. Note that, the inner ring 66 is different from the inner ring 60 in a point in that the sectional shape thereof is slightly smaller than that of the inner ring 60.

With this structure, unlike in the bearing seal B5 of the modification 5, the inner ring 66 can be embedded in the connecting portion 53 afterwards, that is, after molding the seal 50. Accordingly, the molding of the seal 50 can be facilitated.

Note that, dimensions and shapes of the inner rings 61 to 66 as described in the modifications 1 to 6, respectively, are not limited to those, other dimensions and shapes may be employed.

In each of the first and second embodiments and the modifications 1 to 5, the bearing seal A, B, B1 to B6 are fixed to the inner peripheral surface of the boss 102 through the outer ring 10, 40. However, the outer seal portion 25, 51 is fixed to the inner peripheral surface of the boss 102 in a state where the outer ring 10, 40 is omitted.

INDUSTRIAL APPLICABILITY

The present invention can be utilized to a pinpoint joint for a construction machinery such as a hydraulic excavator, and also to a bearing portion for various

The invention claimed is:
1. A bearing seal that seals an outer periphery of a shaft, said bearing seal comprising:
a ring-shaped outer seal portion;
a ring-shaped inner seal portion provided inside the outer seal portion;
a connecting portion which connects the inner seal portion and the outer seal portion; and
a ring-shaped rigid portion provided at the connecting portion,
wherein:
the outer seal portion, the inner seal portion, and the connecting portion are integrally formed of a common material consisting of an elastic material;
the inner seal portion has a ring-shaped seal surface gradually approaching a ring center axis of the inner seal portion while extending from a side of a ring-shaped base end connected to the connecting portion toward a distal end side;
the inner seal portion has the ring-shaped seal surface on an inner peripheral surface thereof and has a tapered cylindrical shape extending from the base end side to the distal end side such that a thickness of the inner seal portion gradually decreases from the base end side toward the distal end side where the ring-shaped seal surface on the inner peripheral surface gradually approaches the ring center axis of the inner seal portion while extending from the side of the ring-shaped base end connected to the connecting portion toward the distal end side, and the inner seal portion extends toward a side away from a lubricant oil storage space defined at least in part by the outer periphery of the shaft;
the inner seal portion includes only one inner seal portion, and the ring-shaped base end of the inner seal portion is spaced apart from the shaft such that the inner seal portion is in contact with the shaft at only a single location at the distal end side; and
cross sections of the outer seal portion, the inner seal portion and the ring-shaped rigid portion are constructed so that a rigidity of the inner seal portion is less than a rigidity of the ring-shaped rigid portion and is greater than a rigidity of the outer seal portion.
2. The bearing seal according to claim 1, wherein the inner seal portion has a thick portion on the distal end side.

3. The bearing seal according to claim 1, wherein the ring-shaped rigid portion is integrally formed from the same material as the outer seal portion, the inner seal portion, and the connecting portion.

4. The bearing seal according to claim 1, wherein the ring-shaped rigid portion is provided as a different member from the outer seal portion, the inner seal portion, and the connecting portion, and is formed of a rigid body.

5. The bearing seal according to claim 4, wherein the ring-shaped rigid portion is partially or entirely embedded in the connecting portion.

6. The bearing seal according to claim 4, wherein the ring-shaped rigid portion is partially in contact with the connecting portion.

7. The bearing seal according to claim 1, further comprising:
   an outer ring made of a rigid body and formed in a ring shape so that the outer ring surrounds the outer seal portion.

8. The bearing seal according to claim 1, wherein the ring-shaped seal surface of the inner seal portion includes an innermost peripheral portion at the distal end side, the innermost peripheral portion being the only part of the inner seal portion in contact with the shaft.

* * * * *